United States Patent [19]

Hanisch et al.

[11] 4,267,093

[45] May 12, 1981

[54] AQUEOUS SUSPENSION OF INORGANIC OXIDIC MATERIAL

[75] Inventors: Horst Hanisch, Niederkassel-Mondorf; Karl-Martin Rödder, Troisdorf-Spich; Robert Büning, Troisdorf-Sieglar; Hans-Jürgen Hass, Troisdorf-Spich, all of Fed. Rep. of Germany

[73] Assignee: Dynamit Nobel Aktiengesellschaft, Troisdorf, Fed. Rep. of Germany

[21] Appl. No.: 59,878

[22] Filed: Jul. 23, 1979

[30] Foreign Application Priority Data

Jul. 21, 1978 [DE] Fed. Rep. of Germany ....... 2832111

[51] Int. Cl.$^3$ ............................................. C08L 33/02
[52] U.S. Cl. ............................................. 260/29.6 H

[58] Field of Search ................. 260/29.6 H, 29.6 RW; 526/271, 279

[56] References Cited

U.S. PATENT DOCUMENTS

| 3,560,589 | 2/1971 | Sato | 525/114 |
| 4,097,436 | 6/1978 | Buning | 526/279 |

Primary Examiner—Paul R. Michl
Attorney, Agent, or Firm—Sprung, Felfe, Horn, Lynch & Kramer

[57] ABSTRACT

Aqueous filler suspension composed of inorganic oxide material and a dispersing agent, characterized in that it contains as dispersing agent an aqueous solution of maleic acid-vinyl alkoxysilane copolymer.

1 Claim, No Drawings

4,267,093

AQUEOUS SUSPENSION OF INORGANIC OXIDIC MATERIAL

BACKGROUND

The subject of the present invention is aqueous suspensions of inorganic oxidic material which have a lower viscosity than suspensions known heretofore having the same solid-matter content.

It is known that the smaller the individual particles of inorganic fillers or pigments are, the better they can be dispersed in water. In general, comminution of such materials is achieved by mechanical action in an aqueous medium. The fine particles thus obtained, however, have a tendency to reagglomerate. A number of dispersing agents for the prevention of this reagglomeration have already become known.

The known dispersants bring about an increase in the electrokinetic potential; they are adsorbed selectively onto the particles, thereby increasing the charge density on their surfaces. Consequently, those compounds have heretofore been considered as dispersants which have a very large number of negative charges per molecule, an example being tetrasodium pyrophosphate ($Na_4P_2O_7$) as a representative of the inorganic polyanionic compounds, and organic polycarboxylic acids as organic dispersants.

The dispersing action of the polyphosphates for a number of pigments and fillers is just as good as that of the polycarboxylic acids. They have the disadvantage, however, that they decompose during storage as well as when exposed to elevated temperatures.

The polycarboxylic acids known as dispersants are obtained, for example, by the polymerization of acrylic or methacrylic acid or by the saponification of acrylonitrile. In this manner chain-like products are formed, which preferably should contain 18 to 24 carbon atoms per chain.

Whether polycarboxylic acids or polyphosphates are used, the amount of oxidic material that can be incorporated while still maintaining a good working viscosity in the suspension is limited. Known filler or pigment systems having a 70% solids content, such as those desired, for example, by the paper industry, have already a very high viscosity, which makes them difficult to use.

The problem therefore existed of producing aqueous suspensions of good stability having high contents of solid inorganic oxide material, and viscosities decidedly lower than those of the systems known hitherto.

THE INVENTION

As a solution to this problem, aqueous suspensions composed of inorganic oxide material and a dispersant have been invented which are characterized by containing as the dispersant an aqueous solution of maleic acid-vinyl alkoxysilane copolymers.

Aqueous suspensions in accordance with the invention have viscosities which are lower by at least one half than those of suspensions containing the known dispersants in the same amount, and having a comparable content of a filler or pigment treated mechanically in a comparable manner. In many cases the viscosity of the suspensions in accordance with the invention is a full order of magnitude lower than that of comparable, known suspensions.

Therefore, it is furthermore possible by means of the hydrolyzates of vinyl alkoxysilane copolymers to disperse a greater amount of inorganic solid oxidic substance in aqueous systems than with the known dispersing agent, without increasing the viscosity of the suspensions obtained. The suspensions are at least just as stable as suspensions containing polycarboxylic acids as dispersants.

Maleic acid anhydride-vinyl alkoxysilane copolymers (referred to hereinafter also as MS-VTS copolymers) are known compounds in themselves. Their production is described, for example, in U.S. Pat. No. 3,560,589. This term accordingly includes maleic acid-vinyl trialkoxysilane copolymers, and also those copolymers in which one or two of the alkoxy groups of the vinyl silane component can be replaced by a low alkyl moiety. Also, a different ethylenically unsaturated acid anhydride, such as for example citraconic acid anhydride, aconitic acid anhydride or itaconic acid anhydride can be used instead of the maleic acid component.

Aqueous solutions of these MS-VTS copolymers can be prepared by the method described in German Offenlegungsschrift No. 2,624,888. Therefore, either the MS-VTS copolymer is dissolved in dilute alkalies, or it is dissolved in an alcohol at slightly elevated temperatures (up to the boiling point of the alcohol) and the ester obtained is hydrolyzed. The precipitate thus obtained is then dissolved in dilute alkalies or anhydrous ammonia. The alkaline solution can be neutralized or even slightly acidified, without the formation of a precipitate.

Regardless of the way in which the water-soluble hydrolyzate of the maleic acid-vinyl alkoxysilane copolymer has been prepared, it acts in the manner described above as a dispersant for inorganic oxide solids. The amount required for this effect is between 0.1 and 2.0% of the weight of the solids. The amount preferentially to be used depends, however, on the nature of the inorganic oxide and on the amount to be suspended, as well as on the mechanical treatment applied to the inorganic oxide.

The fillers or pigments for whose dispersal the hydrolyzate solutions of the maleic acid-vinyl alkoxysilane copolymers can be used include both relatively polar, or in some cases amphoteric, and unpolar oxidic materials. The relatively polar materials include, for example, silicon dioxide, diatomaceous earth, silicates such as talc and kaolin, titanium dioxide, and clay minerals such as kaolinite, vermiculite, montmorillonite and china clay. The relatively polar materials also include aluminum hydroxide as an amphoteric compound, and aluminates such as, for example, calcium aluminate or satin white.

Calcium carbonate and barium sulfate are examples of relatively unpolar materials.

The aqueous solutions of maleic acid-vinyl alkoxysilane copolymers have an intensified dispersant action mainly on relatively polar and amphoteric fillers and pigments. With relatively unpolar materials, the dispersant action is of the same order of magnitude as that of the known dispersants if comparable amounts are used. With these materials, an enhanced action is obtained, in the case of calcium carbonate, for example, if amounts are used with which polycarboxylic acids, for example, produce an increase in the viscosity (amounts, for example, of around 1% active substance).

The grain sizes of the fillers or pigments in the suspensions are to be within the limits within which they are generally used in the applications specified further below. In the coating of paper, the average particle size of the fillers is between 0.1 and 2.5 micrometers, preferably between 0.5 and 1.5 micrometers. When inorganic oxidic materials are used in dispersion paints the average particle size can be larger, and can amount to as much as 50 micrometers.

The content of fillers or pigments in the suspensions can again vary widely depending on the application. In paper coating it is generally between 50 and 70% of the weight of the suspension; however, still larger amounts of the materials can be suspended without making the suspension too viscous, if the hydrolyzates of MS-VTS copolymers are used.

The suspensions in accordance with the invention are used chiefly in paper coating. They serve, for example, to increase the whiteness and the opacity of paper. They are furthermore used in the production of dispersion paints.

EXAMPLES

Example 1

For the preparation of a dispersant solution, 200 grams of a maleic acid-vinyl triethoxysilane copolymer were introduced into 800 grams of a 1% aqueous ammonia solution. The copolymer first expands and then dissolves, and a yellowish solution is obtained.

In an 800 milliliter beaker, 5.6 cm$^3$ of the above solution was mixed with 200 ml of demineralized water, and 448 grams of aluminum hydroxide were gradually added to the solution while stirring with a paddle stirrer. The stirring speed was 10 revolutions per minute. Then the suspension, which had a solid matter content of 70%, was heated at 22° C. for 10 minutes in a water bath with continued stirring. Then the viscosity was determined with a Brookfield viscosimeter. It amounted to 45 centipoises.

A suspension was prepared in the same manner with the same amounts, but was stirred at a stirring speed of 50 rpm. This suspension had a viscosity of 80 centipoises.

For comparison, 70% aluminum hydroxide suspensions were prepared in entirely the same manner, in which 0.25 wt.-% of a commercially obtainable polycarboxylic acid was used as the dispersant. The suspension obtained had viscosities of 640 centipoises (stirred at 10 rpm) and 304 cps (stirred at 50 rpm).

Example 2

Example 1 was repeated in the same manner except that the aqueous solution into which the aluminum hydroxide was mixed contained in one case twice and in the second case four times the amount of dispersing agent, so that the dispersant content was 0.5% and 1.0% with respect to the filler. The measured viscosities are given in the following Table 1.

TABLE 1

| Dispersant | | | Viscosity |
|---|---|---|---|
| Kind | Amount (%) | rpm | cps |
| Maleic acid-vinyl triethoxysilane copolymer hydrolyzate | 0.25 | 10 | 45 |
| | 0.50 | 10 | 70 |
| | 1.0 | 10 | 80 |
| Maleic acid-vinyl triethoxysilane copolymer hydrolyzate | 0.25 | 50 | 80 |
| | 0.50 | 50 | 80 |
| | 1.0 | 50 | 96 |
| Polycarboxylic acid | 0.25 | 10 | 640 |
| | 0.50 | 10 | 1280 |
| | 1.0 | 10 | 1280 |
| Polycarboxylic acid | 0.25 | 50 | 304 |
| | 0.50 | 50 | 430 |

TABLE 1-continued

| Dispersant | | | Viscosity |
|---|---|---|---|
| Kind | Amount (%) | rpm | cps |
| | 1.0 | 50 | 440 |

Example 3

In an 800 ml beaker, 3.7 ml of the solution described in Example 1, paragraph 1, of a maleic acid-vinyl triethoxysilane copolymer was mixed with 200 ml of demineralized water. 371 g of kaolin was added gradually to the solution while stirring with a paddle stirrer, so that the solids content of the suspension was 65% by weight. The stirring speed was 20 rpm. Then the suspension was heat treated for ten minutes at 22° C. in the water bath while stirring at the same speed. The viscosity was immediately tested with a Brookfield viscosimeter, and amounted to 1200 cps.

Examples 4 to 7

As in Example 3, the viscosity of suspensions was determined which contained 0.3% (Example 4), 0.4% (Example 5) and 0.5% (Example 6) of the same dispersant instead of 0.2%. For comparison, a dispersion was prepared with 0.5% of a known dispersant based on polycarboxylic acids, and its viscosity was determined in the same manner (Example 7). The results are given in Table 2.

TABLE 2

| Example | Dispersant % | Viscosity cps |
|---|---|---|
| 3 | 0.2 | 1200 |
| 4 | 0.3 | 1100 |
| 5 | 0.4 | 1000 |
| 6 | 0.5 | 900 |
| 7 | 0.5 | 5900 |

Example 8

A dispersant solution was prepared by dissolving 100 g of maleic acid-vinyl triethoxysilane copolymer in 900 g of 3% aqueous sodium hydroxide solution. The copolymer first swells up and then dissolves. The solution obtained has a yellowish color.

6 ml of this solution was mixed into 155 ml of demineralized water and 300 g of kaolin was added in portions to the solution while stirring with a paddle stirrer at a rate of 20 rpm, so that a 65% suspension was formed with the addition of 0.2% of the dispersant. The rest of the treatment of the solution was performed as in Example 1.

Measurement of the viscosity as in Example 1 showed a viscosity of 350 cps.

Example 9

A dispersant solution was prepared by putting 100 g of maleic acid-vinyl triethoxysilane copolymer into 900 g of a 3% aqueous solution of potassium hydroxide. The copolymer first swelled up and then went into solution assuming a yellow color.

6 ml of this solution was mixed with 155 ml of demineralized water and 300 g of kaolin was added to the solution as in Example 8, and the suspension was heat treated. The viscosity, determined as in Example 1, was 200 cps.

Example 10

The solution described in Example 1, par. 1, was used for the tests described in this example. In each case, 20 cm³ of this solution was mixed with 150 cm³ of demineralized water and 400 g of finely powdered CaCO₃ (particle size: 70% larger than 2.0 micrometers) was added in portions, with stirring, to the solution thus obtained. In one test (a) the stirring speed was 10 rpm, and in a second test (b) it was 50 rpm. The viscosity of the suspensions obtained was determined as in Example 1.

For comparison, a 70% suspension of the same calcium carbonate in water was prepared under the same conditions with the addition of 1.0% by weight, of a commercial polycarboxylic acid, with respect to CaCO₃ and the viscosities were measured. The results are given in Table 3 (tests c and d).

TABLE 3

| Test | Stirring speed rpm | Viscosity cps |
|---|---|---|
| a | 10 | 1100 |
| b | 50 | 560 |
| c | 10 | 1300 |
| d | 50 | 440 |

Example 11

A 65% suspension of china clay containing 1% of a maleic acid-vinyl triethoxysilane copolymer was prepared as in Example 1. The stirring speed was 50 rpm. After heat treatment at 22° C., the viscosity amounted to 400 cps.

A suspension prepared in the same manner and containing a commercial polycarboxylic acid as dispersant, which had been stirred at the same speed, had a viscosity of 1880 cps.

We claim:

1. Aqueous filler suspension composed of inorganic oxide material and a dispersing agent, characterized in that it contains as a dispersing agent an aqueous solution of maleic acid-vinyl alkoxysilane copolymer.

* * * * *